Patented Nov. 4, 1952

2,616,863

UNITED STATES PATENT OFFICE 2,616,863

DRYING OIL COMPOSITION

Herman S. Bloch, Chicago, and Edward M. Geiser, Downers Grove, Ill., assignors to Universal Oil Products Company, Chicago, Ill., a corporation of Delaware No Drawing. Application October 28, 1950, Serial No. 192,836

12 Claims. (Cl. 260—23)

This invention relates to an improved drying oil for use in synthetic coating compositions in which drying oils are customarily employed or required, said drying oil comprising a mixture of high molecular weight organic compounds derived from at least two components, one of which is a fatty acid ester and the other, a cyclic, non-aromatic hydrocarbon having multiple conjugated olefinic double bonds. More specifically, the invention concerns a drying oil composition having superior drying qualities in its capacity to undergo rapid oxidative drying when exposed to atmospheric oxygen to form a dried film of greater hardness and toughness than the unsaturated fatty acid glyceride or unsaturated hydrocarbon drying oil components are capable of producing individually, the unsaturated hydrocarbon drying oil component being selected from the class characterized as hydrocarbon conjunct polymers and the fatty acid ester drying oil being selected from the class characterized as styrenated unsaturated fatty acid esters combined in a specified manner as hereinafter provided.

One of the principal factors involved in the oxidative drying of a thin film of drying oil upon exposure of the film to atmospheric oxygen and a factor which is believed to be responsible for the development of desirable toughness and hardness in the ultimate dried film as well as being one of the primary contributing factors in determining the drying rate for the oil is the number of functional substituents in the molecular structure of the drying oil molecule. A functional group in a drying oil molecule is a chemical group capable of ready conversion to a radical which becomes the center of polymerization and/or oxidation activity when the drying oil is exposed to atmospheric oxygen, the radical generally combining in some manner with a molecule or another radical of the same or a different type to form a larger aggregate of greater molecular weight. Functionality in a drying oil is represented by such groups as hydroxyl radicals, olefinic double bonds, ester linkages, carboxyl groups, peroxide groups, etc. which tend to activate the drying oil molecule during the so-called "drying" process, a conjugated dienic or trienic system of double bonds in the hydrocarbon residue of the drying oil molecule constituting one of the most effective polyfunctional organic groupings determinative of the drying rate. Another factor of primary importance in determining the drying properties of a drying oil and especially the physical properties of the dried film, such as its toughness and hardness is the molecular weight of the drying oil molecule subjected to oxidative drying; the higher the molecular weight, in general, the more pronounced are the above properties in the ultimate "dried" film. The drying oil component of this invention, formed by one of the specific methods herein provided, embodies the application of both of the above factors. It is composed of molecules having a large molecular weight and containing multiple functional groups per molecule, including not only glyceride ester linkages, but also a relatively large number of conjugated olefinic double bonds per molecule.

One object of this invention is to prepare a drying oil composition capable of undergoing oxidative drying when exposed to atmospheric oxygen to form a hard, tough resinous film, particularly valuable for coating compositions and the like. Another object of the invention is to provide a drying oil composition capable of drying upon exposure to atmospheric oxygen to form a non-tacky protective coating film which does not slip, peel, check, or crack under stress. Still another object of the invention is to provide a drying oil composition which combines the desirable film-forming properties of the unsaturated fatty acid glyceride drying oils with the quality characteristics of an unsaturated hydrocarbon drying oil of the type represented by unsaturated hydrocarbon conjunct polymers, the product possessing more desirable drying oil properties than either drying oil individually.

In accordance with one of its embodiments, the present invention relates to a process for the manufacture of a drying oil composition which comprises combining an unsaturated hydrocarbon conjunct polymer with a styrenated unsaturated fatty acid ester drying oil by a method selected from the group consisting of: (1) physically admixing said hydrocarbon conjunct polymer and said styrenated unsaturated fatty acid ester drying oil in the proportion of from about 5 to about 25% of said ester drying oil to between about 95 and about 75% of said hydrocarbon conjunct polymer, (2) thermally copolymerizing a mixture of said hydrocarbon conjunct polymers and said styrenated unsaturated fatty acid ester drying oil, said mixture containing from about 5 to about 25% of said ester drying oil; and (3) catalytically copolymerizing in the presence of an acidic condensation catalyst a mixture of said unsaturated hydrocarbon conjunct polymers and said styrenated fatty acid ester drying oil containing from about 5 to about 25% of said ester drying oil.

A more specific embodiment of the invention concerns a process for the preparation of a drying oil composition which comprises preparing a mixture of unsaturated hydrocarbon conjunct polymers having a boiling range of from about 200° to about 350° C. and a styrenated linseed oil containing from about 5 to about 50% of styrene by weight, said mixture containing from about 5 to about 25% by weight of said styrenated linseed oil and thermally copolymerizing said mixture at a temperature of from about 100° to about 350° C. to form said drying oil composition.

Another specific embodiment of the invention concerns a drying oil composition consisting essentially of at least one component selected from the group consisting of 1) a physical mixture, 2) a thermally copolymerized mixture, and 3) a catalytically copolymerized mixture of from about 5 to about 25% of a styrenated unsaturated fatty acid ester drying oil containing from about 5 to about 50% by weight of styrene, and from about 75 to about 95% by weight of unsaturated conjunct polymer hydrocarbons boiling between about 150° and about 450° C., said polymers comprising a mixture of polyolefinic, cyclic hydrocarbons containing conjugated and non-conjugated unsaturation, having a bromine number above about 140 and a maleic anhydride value of from about 30 to about 90 and the individual hydrocarbon components of which have from about 2.5 to about 4 double bonds per molecule, from about 40% to about 70% of which are in conjugated relationship to each other.

Other objects and embodiments of this invention relating to specific methods of preparing said drying oil composition and to particular components thereof will be referred to in greater detail in the following further description of the invention.

The component of the present drying oil composition which lends its distinctive properties thereto and modifies the drying characteristics of unsaturated fatty acid ester drying oils to form a combination thereof having more desirable drying properties than either drying oil component individually is a drying oil in itself composed essentially of a mixture of relatively high molecular weight hydrocarbons containing in their molecular structure a homologous series of hydrocarbons containing polyolefinic unsaturation in which the olefinic double bonds are both in conjugated and non-conjugated relationship to each other. These hydrocarbons, referred to herein as "unsaturated conjunct polymers," when cobodied or copolymerized with a styrenated unsaturated fatty acid ester type of drying oil provide the present drying oil composition which is particularly desirable in the preparation of coating compositions, although it is to be emphasized that the unsaturated conjunct polymer component need not of necessity be copolymerized or cobodied with the styrenated fatty acid ester component to obtain the desired advantages herein noted; thus, many of the indicated benefits are obtained by mere physical incorporation of the unsaturated conjunct polymers in the composition as a mixture or in solution with the unsaturated fatty acid ester component. However, the drying oil compositions prepared by cobodying the unsaturated hydrocarbon conjunct polymer component and the unsaturated fatty acid ester drying oil as well as the corresponding catalytic copolymers of said hydrocarbon and ester drying oils are particularly preferred and constitute the most effective drying oil compositions provided herein from the standpoint of capacity to undergo oxidative drying to form hard, tough, tack-free, adherent, and rapid-drying films when exposed as a thin liquid film to atmospheric oxygen.

Unsaturated conjunct polymer hydrocarbons are produced by a process known to the art as a conjunct polymerization reaction in which an unsaturated non-aromatic hydrocarbon monomer containing at least 3 carbon atoms per molecule is contacted with a catalyst generally described as an acid-acting catalyst at reaction conditions suitable to effect a conjunct polymerization reaction. During the course of the latter reaction, a sludge-like product forms as one of the principal products of the reaction which contains substantially all of the catalyst initially charged to the reaction combined in the form of a loosely bound addition complex with the desired unsaturated hydrocarbon conjunct polymers. The latter hydrocarbons are recovered from the sludge by special methods of decomposing the hydrocarbon-catalyst complexes contained in the sludge, as hereinafter described. Suitable unsaturated hydrocarbon charging stocks to the conjunct polymerization reaction comprise the monoolefins (for example, propylene and its higher homologs), the polyolefins (such as butadiene, preferably in admixture with a suitable monoolefin), and/or hydrocarbons containing acetylenic unsaturation, of either straight, branched, or cyclic chain structure and either individually or in admixture with each other. Acid acting or conjunct polymerization catalysts for the production of the desired unsaturated conjunct polymers are selected from the general class of substances referred to as Friedel-Crafts metal halides and certain mineral acid condensation catalysts. Of these general classes of compounds utilizable in the reaction, anhydrous aluminum chloride and aluminum bromide, as well as sulfuric acid and hydrofluoric acid containing, in each case, less than about 10% by weight of water, preferably the substantially anhydrous acids, effect the conjunct polymerization reaction most expeditiously. The reaction is carried out by intimately admixing the hydrocarbon charging stock with the catalyst at temperatures of from about −30° to about 200° C. preferably at from about 0° to about 100° C. and at pressures sufficient to maintain the reaction mixture in substantially liquid phase. Optimum production of the desired sludge is obtained when the weight proportion of catalyst to hydrocarbon charging stock is from about 0.5 to about 2.5, but this proportion may be varied over a considerable range of values outside of the designated proportions to effect the production of a sludge, although not necessarily with equivalent yields. The products of the reaction are a sludge-phase and an upper layer saturated hydrocarbon phase which separates from the sludge upon standing, the desired sludge phase being recovered therefrom by mere decantation.

Decomposition of the sludge to effect recovery of the unsaturated hydrocarbon conjunct polymers therefrom may be accomplished by several alternative procedures, depending upon the catalyst utilized in the conjunct polymerization reaction. One of such methods which may be employed regardless of the particular conjunct polymerization catalyst utilized, consists of hydrolyzing the hydrocarbon-catalyst complexes contained in the sludge by thoroughly admixing the same with water, preferably maintained at a low temperature during the hydrolysis by the presence of an ice-phase in an aqueous hydrolyzing medium. During the hydrolysis, the unsaturated conjunct hydrocarbon polymers associated with the catalyst in the sludge are released from this association and form an immiscible upper layer, while the water-soluble catalyst enters the lower aqueous phase.

An alternative sludge decomposition procedure, generally considered the most economical and the preferred method, utilizable when the catalyst to the conjunct polymerization reaction is the volatile hydrogen fluoride catalyst, is by means of thermal decomposition in which the sludge is heated until the hydrogen fluoride is vaporized therefrom. A product containing a greater degree of unsaturation is obtained when the sludge is thermally decomposed in the presence of a suitable catalyst which enhances the decomposition, such as metallic particles of lead, copper, cobalt, and certain brasses containing copper, lead and tin, particles of graphitic carbon and certain metallic fluoride and oxyfluoride salts.

The mixture of unsaturated conjunct hydrocarbon polymers recovered from the sludge consists of polyolefinic, cyclic hydrocarbons containing conjugated and non-conjugated unsaturation, of relatively high molecular weight, of wide boiling range, but generally of homologous structure, the cyclic portion of the hydrocarbons having a cyclopentenyl structure in which the olefinic bond contained in the cyclopentene ring is in conjugation with one or more olefinic bonds present in the alkenyl or alkapolyenyl side chains attached to the cyclopentene ring. The individual hydrocarbons in the mixture are cyclic, although substantially non-aromatic, and contain isolated unsaturation in addition to conjugated unsaturation. The mixture of unsaturated conjunct polymer hydrocarbons boils at a temperature of from about 150° to about 450° C., has a bromine number above about 140, a maleic anhydride value of from about 30 to about 90, and consists of hydrocarbons which contain from from about 2.5 to about 4 double bonds per molecule, of which from about 40 to about 70% are in conjugated relationship with each other. Hydrogen to carbon atomic ratios of the hydrocarbons contained in the unsaturated hydrocarbon fraction vary within relatively narrow limits, generally from about 1.67 to about 1.72 with the actual weight percentages of hydrogen varying from about 12.35 to about 12.6.

The styrenated unsaturated fatty acid ester drying oils utilized in the preparation of the present drying oil composition, are formed in a preliminary process by the copolymerization of a suitable proportion of styrene with an unsaturated fatty acid ester drying oil. Suitable ester drying oils for this purpose may be selected from those which occur either naturally as fatty acid glycerides or the synthetic modified fatty acid esters in which the glyceride ester linkage is replaced by esters of other types of alcohols, such as methanol, ethanol, and homologs, a glycol, a polymeric glycol, such as a member of the polyethylene glycol series, other polyhydric alcohols, such as pentaerythritol, polyallyl alcohol, and 2,2-dimethylol-propanol, or an unsaturated alcohol, such as butenol. Typical unsaturated fatty acid ester drying oils which may be styrenated to form one of the primary reactants contemplated in the present invention include such semi-drying fatty acid esters as perilla oil, soybean oil, hempseed oil, poppyseed oil, safflower oil, walnut oil, etc., and particularly the oils selected from the rapid drying unsaturated fatty acid glycerides containing polyenic, and particularly, conjugated polyenic unsaturation, such as tung oil, linseed oil, dehydrated castor oil, and oiticica oil, the preferred members of the above series being tung oil and boiled linseed oil. The styrenated unsaturated fatty acids themselves derived from a natural glyceride and recovered therefrom by hydrolysis, for example, are also utilizable in the present process, although these are not generally preferred when substantially neutral, non-corrosive drying oil compositions are desired or required. Copolymerization of the unsaturated fatty acid or ester derived therefrom with styrene to form the so-called "styrenated" unsaturated fatty acids herein utilized as one of the primary reactants in the preparation of the present drying oil composition may be effected thermally by heating the styrene and unsaturated fatty acid ester reactants under pressure, if necessary, to maintain substantially liquid phase conditions, to a temperature of from about 50° to about 250° C. or, as preferred herein, catalytically, by heating the reactants in the presence of a catalyst capable of yielding a free radical in the reaction mixture, such as a peroxidic polymerization catalyst. In order to prepare a drying oil suitable for the process of the present invention by either thermal or catalytic copolymerization of styrene with the unsaturated fatty acid ester, from about 5 to about 50% by weight of the reaction mixture is styrene, resulting in the formation of a copolymer product containing a corresponding proportion of styrene. In this process the mixture of reactants is heated to the indicated temperature in a suitable, efficiently stirred reaction kettle in which the formation of high-temperature, static films of the reactants or copolymer adjacent to the walls of the kettle in which the reaction is carried out is prevented by thorough and efficient stirring. In the preferred method of copolymerization utilizing a catalyst capable of yielding a free radical in the mixture of reactants, such as a compound containing a peroxidic group or azo linkage, the formation of the styrenated oil may be effected at relatively lower reaction temperatures and at a more rapid rate, yielding a product of more desirable physical properties, such as a generally lighter color. The preferred catalysts for the preparation of the styrenated oil as one of the primary reactants in the present process are the organic peroxides, including such compounds as di-tert-butyl peroxide, benzoyl peroxide, ascaridole, tert-butyl perbenzoate, tert-butyl hydroperoxide, and the various ozonides and peroxides obtained by ozonizing or oxidizing isoprene, diisobutylene, cyclohexene, and other hydrocarbons or hydrocarbon mixtures. The peroxide may be formed in situ in the reaction mixture by aerating the unsaturated fatty acid ester drying oil during its copolymerization with the styrene or in a preliminary stage of the process by passing air or air-ozone mixtures through the drying oil at moderate temperatures. Of the above peroxidic types of catalyst, benzoyl peroxide or a peroxide derivative formed by oxidizing the unsaturated glyceride drying oil in situ is generally preferred in the preparation of the styrenated product. The peroxidic catalyst, if utilized, may be added directly to the mixture of styrene and unsaturated fatty acid glyceride reactants, generally in amounts of from about 0.01 to about 2% by weight of the reactants, and following completion of the resulting copolymerization reaction, the residual portions of catalyst which have not reacted with the copolymer may be allowed to remain in the styrenated oil without markedly affecting the qualities of the product.

The unsaturated hydrocarbon conjunct polymers, containing as they do a large number of conjugated and nonconjugated olefinic double bonds per molecule are capable of being copolymerized with other unsaturated compounds, such as the present styrenated unsaturated fatty acid ester copolymers to form a product having a greater molecular weight and a larger total number of olefinic bonds per molecule than either the conjunct hydrocarbon polymer or fatty acid ester starting material. The copolymer thereby obtained has greater molecular weight which accounts for dried films of tougher and more elastic properties and is also capable of drying to a tougher, solid, non-tacky film in shorter drying periods by virtue of the greater unsaturation resident in the structure of the copolymer molecules, the increased number of olefin bonds increasing the functionality present in the structure of the product which, in turn, enhances the drying speed of the resulting copolymers. The particular species of the present drying oil compositions consisting of the thermal or catalytic copolymers of a styrenated fatty acid ester and a conjugated hydrocarbon conjunct polymer are particularly desirable as drying oil products, since they are generally superior in drying properties to otherwise similar coating compositions containing merely an unsaturated fatty acid glyceride or other drying oil of either the hydrocarbon or ester type.

It has been found in actual drying tests of compositions prepared by the process herein provided and containing varying proportions of the individual drying oil ingredients, in physical mixtures as well as cobodied mixtures, that when the drying oil composition contains less than 5% of the styrenated unsaturated fatty acid ester drying oil, including compositions containing 0%, as well as compositions containing more than 25% by weight of the styrenated fatty acid ester drying oil, the dried films formed upon exposure of the drying oil composition in thin films to atmospheric oxidation are brittle and non-adherent to the surface to which the liquid composition is applied; the resulting film checks and peels upon application of pressure thereon and in other respects produces an undesirable dried film. It is therefore signal to the successful preparation of a desirable drying oil composition that the mixture contain not less than 5%, but not more than 25% of the styrenated unsaturated fatty acid ester drying oil. Within these limits on the composition of the present product, the latter, when utilized in a coating composition yields a product of desirable drying properties, since the components are capable of combining in the optimum proportions required for the production of a suitable protective coating film via polymerization and oxidation; beyond the above limits on the composition, however, that is, when the styrenated fatty acid ester is present in the composition in quantities less than 5% by weight of the product or more than 25% by weight thereof, the dried films on oxidative drying tend to possess the undesirable properties hereinabove noted, particularly brittleness and the tendency to be non-adhesive to the surface to which the drying oil is applied.

In the preparation of one of the alternative species of drying oil compositions herein provided, comprising a physical mixture of unsaturated conjunct polymers and the styrenated fatty acid ester drying oil these ingredients are merely mixed at normal or room temperatures in the proportion of from 5 to about 25% of the styrenated fatty acid ester drying oil to from about 75 to about 95% of the unsaturated hydrocarbon conjunct polymer drying oil until a uniform mixture of the two drying oils is obtained.

The species of drying oil composition herein referred to as thermally cobodied mixtures of the styrenated fatty acid ester and unsaturated conjunct polymer hydrocarbon ingredients is prepared by heating the mixture of drying oils containing not more than 25% and not less than 5% by weight of the styrenated drying oil ingredient to a temperature of from about 100° to about 350° C. for a cobodying reaction period of from about ½ to about 6 hours, or until the desired viscosity is obtained, preferably a viscosity of from about 10 to about 40 poises. In the production of the thermally cobodied species of drying oil composition provided herein, the ingredients are desirably stirred as they are heated to reduce the tendency of the product to discolor as a result of the development of excessive "skin" temperatures of the mixture adjacent to the heating surface of the kettle in which the ingredients are heated. The heating is also desirably effected in a closed vessel containing an inert atmosphere of carbon dioxide, nitrogen, or other non-oxidizing vapor over the surface of the oils undergoing the thermal cobodying reaction, thereby preventing oxidative deterioration of the product during the heat bodying reaction. The process results in a copolymerization of the unsaturated reactants, the polymerization occurring between the unsaturated bonds of the reactant drying oil molecules.

The species of drying oil composition referred to herein as a catalytic copolymer of a styrenated fatty acid glyceride and a mixture of hydrocarbon conjunct polymers is produced by heating the indicated drying oil reactants in the presence of a suitable polymerization catalyst, selected generally from the broad class of catalytic substances known in the art as acid-acting inorganic compounds or molecular addition complexes thereof with certain oxygen-containing organic compounds. The styrenated glyceride of an unsaturated fatty acid and the unsaturated conjunct polymer hydrocarbon mixture are mixed in the above-indicated range of proportions (that is, in amounts sufficient to form mixtures containing not less than 5 per cent and not more than about 25 per cent of the styrenated fatty acid glyceride reactant) and heated in an inert atmosphere, accompanied by vigorous stirring, to a temperature of from about 0° to about 250° in the presence of the polymerization catalyst, added to the reaction mixture in amounts of from about 0.1 to about 10 per cent by weight of the reactants. Catalysts suitable for effecting the copolymerization reaction are, in general, the aforementioned acid-acting inorganic compounds or their addition complexes, preferably such catalysts as aluminum chloride, aluminum bromide, ferric chloride, magnesium chloride, zinc chloride, bismuth chloride, nickel chloride and bromide, stannous and stannic chlorides, and other halide salts of the Friedel-Crafts metal halide class; certain mineral acids, such as sulfuric and hydrochloric or hydrobromic acid, boron trifluoride and boron trichloride, as well as others generally known in the art. One of the preferred catalysts for the reaction are the molecular addition complexes of the above acid-acting catalysts with organic oxygen-containing compounds such as the ethers, particularly diethylether, which forms the preferred monoetherate, or dioxan; the alcohols, particularly methanol, ethanol and propanol which form the mono-alcoholates; the carboxylic acids, particularly formic and acetic acids which form the corresponding mono-carboxylates such as aluminum chloride mono-acetate; the ketones, particularly acetone which forms the mono-acetonates; the nitro-substituted alkanes, particularly nitromethane, nitroethane, etc.; and the esters, particularly ethylacetate, ethylproprionate etc. One of the preferred catalysts of the latter molecular addition complexes is boron trifluoride mono-ethyletherate which is utilized in the reaction mixture in the preferred ratio of catalyst to reactants of from about 1.0 to 5.0 per cent by weight of the combined charging stocks. Following completion of the copolymerization reaction, usually after a reaction period of from about 0.5 to about 6 hours at the above indicated temperatures, the catalyst may be removed from the product by water or mild caustic washing, as with sodium carbonate-bicarbonate solutions. The product formed by the catalyzed copolymerization reaction is generally of somewhat lighter color than the thermal copolymer and may be somewhat more viscous as well. The copolymerization is preferably continued until the product has a viscosity of from about 5 to about 50 poises, and preferably from about 10 to about 20, although the latter factor may generally be varied by a suitable choice of reaction conditions to form a product particularly desirable for a specific purpose.

Each species of the products of the present invention, whether the physical mixture of styrenated unsaturated fatty acid ester and the mixture of unsaturated conjunct polymers, the thermal or catalytic copolymer of said ester and hydrocarbon drying oils in each of which from 5 to about 25% of the composition is the styrenated fatty acid ester, is utilizable in a variety of coating compositions, such as paints and varnishes, as the drying oil component thereof. The present products are particularly suitable for this purpose because of their resistance to aqueous media, including alkalis, arising by virtue of the large proportion of hydrocarbon residue in the molecular composition of the drying oil ingredient. The present products are also particularly effective drying oil ingredients because of their rapid drying characteristics (due, in part, to the large number of conjugated and non-conjugated double bonds per molecule) and the physical appearance and properties of the dried film resulting upon exposure of the drying oil as a thin film to atmospheric oxidation. The qualities particularly noteworthy are the hardness and toughness of the film on oxidative drying, the quality of being strongly adhesive to solid surfaces to which the composition is applied, and resistance of the film to abrasion. The present products may also be utilized in the production of resinous products by reaction thereof with other resinifying compounds.

The present invention is further illustrated with respect to specific reactants, catalysts, and methods of preparation in the following examples, which, however, are not intended to limit the generally broad scope of the invention in strict accordance therewith.

EXAMPLE I

*Preparation of unsaturated hydrocarbon conjunct polymers*

A mixture of unsaturated hydrocarbon conjunct polymers comprising polyolefinic cyclic hydrocarbons in which the olefinic unsaturation is both conjugated and non-conjugated was prepared by hydrolzing a sludge formed by reacting a mixture of olefinic hydrocarbons comprising a fraction of a co-polymer gasoline (the product of the mixed polymerization of propylene and butylene monomers) with hydrogen fluoride, separating a sludge phase and thereafter hydrolyzing the sludge to recover the unsaturated hydrocarbon conjunct polymers. In the production of these hydrocarbons, 22 liters (15.5 kg.) of the copolymer gasoline having a bromine number of 162 and containing mono-olefinic hydrocarbons varying in molecular weight from octene to dodecylene are charged into a pressure autoclave and rapidly stirred as 9.0 kg. of liquid anhydrous hydrogen fluoride are introduced into the reactor. The pressure is maintained at approximately 205 pounds per square inch and the temperature at 91° C. as stirring is continued for a reaction period of approximately 1 hour. An upper saturated hydrocarbon phase is separated after allowing the reaction mixture to settle and is decanted from the lower acidic sludge layer containing substantially all of the hydrogen fluoride originally charged to the reaction.

5,000 grams of the sludge layer separated from the reaction mixture was water-hydrolyzed by allowing the sludge to flow into a mixture of ice and water as the mixture was rapidly stirred, additional ice being added as the heat of the resultant hydrolyzing reaction melted the ice.

2,170 grams of a light colored, sweet-smelling oil which separated from the aqueous phase was decanted and the following physical and chemical properties determined on the separated hydrocarbons:

Boiling range, °C_____ 160 to about 400
Density, $D_4^{20}$_____ 0.863
Molecular weight, average_____ 304
Diene number_____ 85
Bromine number_____ 169
Double bonds per
 molecule, average_____ 3.2

A fraction of this drying oil consisting of the 325–400° C. fraction of the total mixture when spread as a thin film on a test panel (tin-plated sheet steel) and allowed to dry for 3 days (after which no substantial further change in film properties occurred) produced a dry film, which although "dry" to touch, that is, non-tacky and hard, chipped off from the test panel when the latter was flexed; the dried film when exposed to weathering conditions in an accelerated weathering test (exposure of the panel to ultraviolet light [carbon arc] and intermittent sprays of water) discolored rapidly (within 18 hours), checked and peeled within 12 days of accelerated weathering.

A drying oil composition comprising a drying oil mixture was prepared by mixing various proportions of a styrenated fatty acid ester with the 325° to 400° C. fraction of the unsaturated conjunct polymer hydrocarbons prepared as indicated above. The styrenated fatty acid ester utilized in the preparation consisted of the co-polymerization product of styrene and a mixture of linoleic and linolenic acid glycerides. The mixtures subjected to drying tests contained 1, 5, 10, 25 and 28% styrenated fatty acid esters respectively. In each case, the conjunct polymer hydrocarbon mixture was bodied to a viscosity sufficient to provide a uniform viscosity for all the mixtures of 11 poises. In each mixture preparation, the ingredients were vigorously stirred to produce a uniform and evenly distributed mixture. Drying tests were run on the resulting samples of mixtures by plating tin panels with the mixture to a uniform thickness of film and the resulting panels air-dried at constant temperature (30° C.) and humidity (relative humidity: 52%) out of contact with dust particles. Samples were also prepared containing a standard paint drier (0.023% Co as cobalt naphthenate, 0.014% Mn as manganese naphthenate and 0.067% Pb as lead naphthenate). The following table presents the results of the drying tests on the panel samples:

having desirable gloss, toughness, hardness and color stability, which on weathering tests did not check, peel or tend to yellow.

EXAMPLE II

A drying oil composition consisting of the thermal copolymer species of the present invention may be prepared by heating to cobodying temperatures a styrenated mixture of linoleic and linolenic fatty acid glycerides and the 325 to 400° C. fraction of the unsaturated conjunct polymers prepared as in Example I above.

A series of samples containing 1, 5, 10, 25 and 28 per cent of the styrenated glyceride esters is prepared and each sample heated to a uniform cobodying temperature of 220° C. for 3 to 12 hours, until the cobodied mixture has a viscosity of approximately 15 poises. The viscosity of the resultant copolymers is reduced to 11 poises by

TABLE I

*Properties of dried drying oil films on tin panels*

| Percent Styrenated Oil in Hydrocarbon Styrenated Oil Mixture | Presence of Drier | Initial Set, Days | Dust Free, Days | Dried Hard, Days | Brittleness [1] | Sward Hardness | Appearance |
|---|---|---|---|---|---|---|---|
| 0 | None | 1 | 2 | 32 | --- | 4 | Yellow—tacky. |
| 0 | Present | 1 | 1 | 32 | --- | 6 | Do. |
| 1 | None | 1 | 2 | 32 | --- | 5 | Yellow—slightly tacky. |
| 1 | Present | 1 | 1 | 7 | --- | 8 | Yellow—tacky. |
| 5 | None | 1 | 2 | 32 | 0 | 8 | Clear—glossy. |
| 5 | Present | 1 | 1 | 10 | 0 | 7 | Do. |
| 10 | None | 1 | 2 | 28 | 0 | 6 | Do. |
| 10 | Present | 1 | 1 | 21 | 0 | 10 | Yellow—glossy. |
| 25 | None | 1 | 2 | 28 | 0 | 7 | Do. |
| 25 | Present | 1 | 1 | 3 | 0 | 16 | Do. |
| 28 | None | 1 | 2 | 18 | ++ | 6 | Clear checked. |
| 28 | Present | 1 | 1 | 7 | +++ | 12 | Do. |
| 100 | None | 1 | 1 | 9 | 0 | 17 | Clear—glossy. |
| 100 | Present | 1 | 1 | 1 | 0 | 18 | Do. |

[1] Brittleness—the ease of cracking on flexure of the test panel is a measure of brittleness, indicated by + for films which checked readily upon slight flexure, +++ indicating the greatest degree of brittleness on relatively slight flexure, 0 indicating no brittleness and also no softness or tackiness of the film, and — indicating a soft film, --- designating a relatively soft film drying incompletely to a tacky condition.

It is noted in the above series of tests that compositions of the styrenated fatty acid glyceride and unsaturated conjunct polymer hydrocarbons containing less than about 5% by weight of the former component tend to check rapidly, peel from the test panel and undergo undesirable discoloration upon drying, properties which make the composition less desirable as a drying oil component for coating compositions. It is also mixing the required quantity of a solvent naphtha ("Skellysolve C," consisting primarily of heptanes) with the cobodied product. The resultant drying oil samples are thereafter spread to a uniform thickness on tin test panels and dried in a constant temperature (30° C.), constant humidity atmosphere. Inspection of the panels before and after accelerated weathering tests provide the data in the following Table II.

TABLE II

*Quality characteristics of thermally copolymerized styrenated oil conjunct polymer drying oils*

| Styrenated Oil Content, Percent | Initial Set, Days | Dust Free, Days | Dry Hard, Days | Maximum Hardness, Days | Sward Hardness | Brittleness | Appearance |
|---|---|---|---|---|---|---|---|
| 0 | 1 | 2 | 32 | 36 | 4 | --- | Dark red—tacky. |
| 1 | 1 | 2 | 32 | 32 | 5 | --- | Do. |
| 5 | 1 | 2 | 5 | 7 | 8 | 0 | Clear—reddish—glossy. |
| 10 | 1 | 2 | 3 | 8 | 18 | 0 | Do. |
| 25 | 1 | 2 | 3 | 10 | 21 | + | Do. |
| 28 | 1 | 1 | 1 | 2 | 18 | +++ | Do. | noted that compositions containing more than about 25% of the styrenated glyceride oil compound tend to check on drying and were unstable films on the test panel (i. e. tended to peel and crack). Compositions containing amounts of the styrenated fatty acid glycerides within the range of from about 5% to about 25% by weight of the composition, however, produce dried films The data indicate that as the percentage of styrenated fatty acid ester in the composition increases, the drying rate of the thermal copolymer increases, but the brittleness of the resulting dried film likewise increases. The compositions containing from 5 to about 25 per cent of styrenated oil, however, dry to hard films which are relatively more weather resistant than those containing either more or less of the styrenated oil, and which have also been found to be more weather resistant than cobodied linseed oil-unsaturated conjunct polymer compositions or bodied linseed oil alone. The somewhat darker color of the thermally cobodied composition may be substantially reduced by treatment with decolorizing agents such as activated charcoal and in many uses, such as printing ink compositions, the color of the drying oil component is an immaterial factor.

EXAMPLE III

A catalytically copolymerized mixture of a styrenated unsaturated fatty acid ester and unsaturated conjunct polymer hydrocarbon mixture may be prepared by contacting a well-stirred mixture of the drying oil ingredients with a boron trifluoride etherate polymerization catalyst at a temperature of from about 75° to about 100° C. In the preparation of the above drying oil product, a series of samples consisting of mixtures of styrenated oil and the 325–400° C. fraction of unsaturated conjunct polymers containing 1, 5, 10, 25 and 28% of styrenated oil was contacted with the catalyst by adding the etherate dropwise as the mixture of drying oils was rapidly stirred. The temperature was maintained at 75° C. for five hours, following which the reaction mixture was washed successively with dilute aqueous sodium carbonate and water and then distilled at 1.0 mm. mercury pressure to remove volatile products. The residue failing to distill over at 300° C. was reserved as product and consisted of a viscous, dark red material which was reduced in viscosity with "Skellysolve C" to 11 poises and applied in films of uniform thickness to tin panels. The data in the following Table III indicate the drying properties of the product.

TABLE III

Drying qualities of catalyzed copolymer of unsaturated conjunct polymers and styrenated linseed oil

| Styrenated Oil Content, Percent | Initial Set, Days | Dust Free, Days | Dry Hard, Days | Maximum Hardness, Days | Sward Hardness | Brittleness | Appearance |
|---|---|---|---|---|---|---|---|
| 0 | 1 | 2 | 32 | 36 | 4 | ---- | Dk. Brown—tacky. |
| 1 | 1 | 2 | 32 | 30 | 5 | -- | Do. |
| 5 | 1 | 2 | 7 | 10 | 7 | 0 | Dk. Red—glossy. |
| 10 | 1 | 1½ | 4 | 7 | 18 | 0 | Do. |
| 25 | 1 | 1½ | 3 | 8 | 20 | + | Red—glossy. |
| 28 | 1 | 1 | 2 | 18 | 18 | ++ | Red—brittle. |

The above tests indicate the general superiority of the dried films prepared from styrenated oil-unsaturated conjunct polymer compositions containing from 5 to about 25% of the former component, as contrasted with the compositions containing a lower proportion of styrenated oil (which did not completely dry, but remained tacky after 32 days drying) or a higher proportion of styrenated oil (which dried very rapidly to a brittle film and which checked and peeled during the "Weatherometer" test).

We claim as our invention:

1. A drying oil composition consisting essentially of from about 5 to about 25 per cent of a styrenated unsaturated fatty acid ester drying oil containing from about 5 to about 50 per cent by weight of styrene, and from about 75 to about 95 per cent by weight of a mixture of unsaturated conjunct polymer hydrocarbons boiling between about 150° to about 450° C., said polymers comprising a mixture of polyolefinic, cyclic hydrocarbons containing conjugated as well as non-conjugated unsaturation, having a bromine number above about 140 and a maleic anhydride value of from about 30 to about 90, the individual hydrocarbon components of which have an average of from about 2.5 to about 4 double bonds per molecule, from about 40 to about 70 per cent of which are in conjugated relationship to each other.

2. The composition of claim 1 further characterized in that said mixture of unsaturated conjunct polymer hydrocarbons consists of the 325–400° C. fraction of said mixture.

3. The composition of claim 1 further characterized in that said fatty acid ester is linseed oil.

4. A process for the manufacture of a drying oil composition which comprises copolymerizing from about 5 to about 25 parts by weight of a styrenated unsaturated fatty acid ester containing from about 5 to about 50 per cent by weight of styrene with from about 75 to about 95 parts by weight of a mixture of unsaturated conjunct polymer hydrocarbons boiling between about 150° to about 450° C., said conjunct polymers comprising a mixture of polyolefinic, cyclic hydrocarbons containing conjugated as well as non-conjugated unsaturation and having a bromine number above about 140 and a maleic anhydride value of from about 30 to about 90, the individual hydrocarbon components of which have an average of from about 2.5 to about 4 double bonds per molecule, from about 40 to about 70 per cent of which are in conjugated relationship to each other.

5. The process of claim 4 further characterized in that said styrenated fatty acid ester is copolymerized with said unsaturated conjunct polymer hydrocarbon mixture at a temperature of from about 100° to about 350° C.

6. The process of claim 4 further characterized in that said styrenated fatty acid ester is copolymerized with said unsaturated conjunct polymer hydrocarbon in the presence of an acidic polymerization catalyst.

7. The process of claim 6 further characterized in that said polymerization catalyst is a molecular addition complex of a Friedel-Crafts halide and an oxygen-containing organic compound.

8. The process of claim 7 further characterized in that said catalyst is a boron trifluoride etherate.

9. The process of claim 6 further characterized in that said polymerization is effected at a temperature of from about 0° to about 250° C.

10. A drying oil composition as defined in claim 1 further characterized in that the composition is a physical mixture of said fatty acid ester drying oil and said hydrocarbon polymers.

11. A drying oil composition as defined in claim 1 further characterized in that the composition is a thermally copolymerized mixture of said fatty acid ester drying oil and said hydrocarbon polymers.

12. A drying oil composition as defined in claim 1 further characterized in that the composition is a catalytically copolymerized mixture of said fatty acid ester drying oil and said hydrocarbon polymers.

HERMAN S. BLOCH.
EDWARD M. GEISER.

REFERENCES CITED

The following references are of record in the file of this patent:

UNITED STATES PATENTS

| Number | Name | Date |
| --- | --- | --- |
| 2,392,710 | Wakeford et al. | Jan. 8, 1946 |
| 2,523,609 | Bloch et al. | Sept. 26, 1950 |